United States Patent Office 2,868,036
Patented Jan. 13, 1959

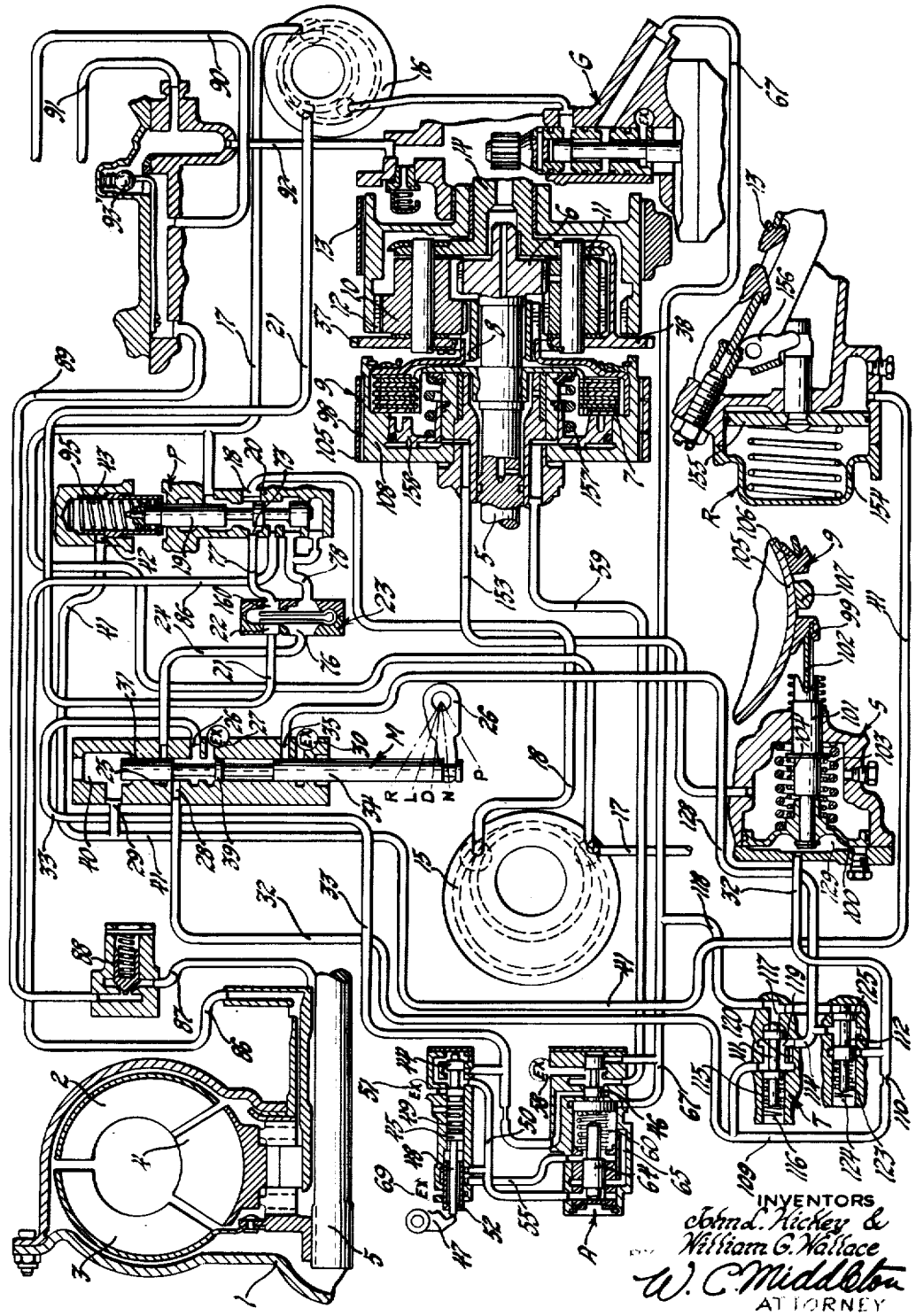

2,868,036

TRANSMISSION CONTROL SYSTEMS

John L. Hickey and William G. Wallace, Fairview Park, Ohio, assignors to General Motors Corporation, Detroit, Mich., a corporation of Delaware Application September 12, 1955, Serial No. 533,679

2 Claims. (Cl. 74—754)

This invention relates to transmissions and more particularly to automatic transmissions of the type employing a hydraulic torque transmitter and automatic step-ratio gearing, and to the control system therefor.

Heretofore various types of automatic transmissions have been employed in vehicles with considerable success. In previous automatic transmissions that utilize step-ratio gearing, while efficient in operation, generally have had one particular disadvantage in that certain shifts of the gearing are rough and objectionable. These rough shifts are particularly evident during downshifts. This is because downshifts are made under varying operating conditions, whereas upshifts are generally made under similar conditions and can be fairly easily controlled. For example, downshifts are made under both low and high speed engine and vehicle conditions. The downshifts are also made under both low and high torque conditions. The transmission can usually be designed to provide smooth downshifts under a particular set of conditions. However, as explained above, the downshifts are made under varying conditions and a design for one set of conditions will provide rough downshifts under other conditions.

In general, shifts can be made smooth in several ways. One method is to vary the pressure on the torque carrying friction elements such as bands and clutches that control the gearing under different conditions. This is to insure that the band or clutch has the correct torque carrying capacity. If this is done the release of torque by the torque carrying element will be smoother and less noticeable.

The shifts can also be made smoother by timing the shifts, i. e., delaying or hastening the release or application of a torque carrying element or reaction sustaining element such as a clutch or band.

It has been found that one of the reasons for rough downshifts is that the direction of torque through the drive train is reversed during the shift. An objectionable lurch is felt where the engine, which has been driving the vehicle, suddenly becomes driven by the vehicle. It has been found that if this reversal of torque during a shift can be prevented, the shift will be considerably smoother. For example, during an open throttle downshift where the operator is accelerating the vehicle, the engine is initially driving the vehicle. If a torque carrying connection, such as a clutch, is released, the transmission will be in neutral until another torque carrying connection is made and a positive drive again established in the transmission. It has been found that under different speed conditions the length of time the transmission should be in neutral to effect a smooth shift will vary.

Upon shifting down at light or closed throttle the vehicle is already driving the engine. Here a different set of conditions exist that necessitate a different control of the ratio change. On placing the transmission in gear after being in neutral with the engine idling, a similar set of conditions exist.

Accordingly it is an object of this invention to provide a control system for a transmission wherein ratio changes are made smoothly and without objectionable lurching or jerking.

Another object of the invention is to provide a transmission control system wherein shifts can be made under varying operating conditions and wherein the time interval between the start of the shift and the end of the shift is varied by these conditions so as to provide smooth and unobjectionable shifts.

These and other objects, features and advantages of this invention will be apparent from the following specification and claims taken in conjunction with the accompanying drawing, in which the figure is a schematic diagram of the transmisison control system as well the torque converter and step-ratio gearing in relation to the control system.

This invention is an improvement on a transmission control system shown in detail and fully described in the copending application of Frank J. Winchell, S. N. 454,581, filed September 7, 1954. The control system may be used with a transmission that is fully described in the copending application of Oliver K. Kelley and Robert S. Plexico, S. N. 291,692, filed June 4, 1952. Consequently, all the details of the transmission are not disclosed in the present application. The transmission consists of a hydraulic torque converter adapted to drive a two-speed planetary step-ratio gearing unit in turn adapted to drive a vehicle load shaft. The torque converter is driven by means of flywheel 1 which in turn drives an impeller 2, a turbine 3, and a fluid reaction member 4. The turbine 3 is connected to drive the input shaft 5 of the planetary gearing. The input shaft 5 carries with it a sun gear 6 that meshes with a long planet pinion gear 11 carried by a planetary carrier that is connected to the output shaft 14. The input shaft 5 is adapted to be connected by means of multiple disk clutch 7 to a second sun gear 8 that rotates with a drum 108 and meshes with a short pinion gear 10 also carried by the planetary carrier connected to the output shaft 14. The long pinion 11 and short pinion 10 are in engagement with each other as well as their respective sun gears. Short pinion 10 is also in engagement with a ring gear 12 mounted for rotation about the output shaft 14 and adapted to be held from rotation at times by friction brake band 13.

The sun gear 8 in addition to be adapted to be clutched to the input shaft 5 can be held against rotation by friction brake band 9. Details of the band are fully shown in the copending application of Edward J. Vosler and Harold W. Schultz, S. N. 439,578, filed June 28, 1954. The band is composed of a Y-shaped band wound twice around the drum, the single center portion of the Y 98 having its free end adapted to be moved by the servo S. Piston 100 acts on rod 101 and member 102 to apply the band 9. Springs 103 and 104 act through the piston 100, rod 101 and member 102 to release the band.

The operation of the planetary gearing will not be explained as the details of construction and operation are shown in the copending applications of Frank J. Winchell and Robert S. Plexico mentioned above. It is sufficient to say that when band 9 is applied by servo S to hold drum 108 the gearing will transmit drive at increased torque and decreased speed and when clutch 7 is applied by piston 158 to lock the drum 108 to input shaft 5 the gearing will transmit direct drive. When band 13 is applied by servo R to hold ring gear 12 the gearing transmits at a reverse reduction ratio.

The control system as shown comprises a pressure supply system including a pump 15 adapted to be driven by the engine shaft and an output pump 16 driven by the output shaft 14. The control system further includes a pressure regulator valve P that regulates pressure in the main line leading to a manual valve M that controls flow of fluid to the low servo S by way of a timing valve assembly T, an automatic shift control unit A and a reverse servo R.

Fluid supply

The pumps 15 and 16 are connected on their input sides to passage 17 leading to a sump or reservoir of oil (not shown). The output of pump 15 passes into conduit 18 leading to the regulator valve body 20. The output of the rear pump 16 passes into conduit 21 which leads to port 22 of the check valve 23. A separate output from pump 16 leads to a governor G that is driven in proportion to the speed of the output shaft 14. This governor G may be any form of governor controlled pressure regulator valve that produces a pressure that varies in accordance with the speed of the governor. The complete details of the governor are not shown, however, reference is made to copending application of Maurice S. Rosenberger, S. N. 322,106, filed November 22, 1952, which application fully describes a form of governor that could be utilized in the present invention.

The check valve 23 serves to prevent the front pump 15 from bleeding to the rear pump 16 when the vehicle and rear pump are in reverse. At low vehicle speeds the front pump acting through conduit 18, the regulator valve P and conduit 77 leading to port 160 of the check valve 23 supplies most of the fluid. When the vehicle speed has increased so that the rear pump 16 is rotating fast enough to supply the necessary volume and pressure of fluid to operate the transmission, the regulator valve P will begin to exhaust the front pump pressure in lines 18 and 77 through the pump intake passage 17. At this time pressure in conduit 21 from the rear pump 16 moves the check valve 23 to close the port 160. The operation of the pressure regulator valve will be described in detail hereinafter.

Manual valve

Main supply line 24 leads from the check valve to port 25 of the manual valve M. This line 24 at all times carries whatever fluid under pressure is produced by the pumps and regulated by the regulator valve P. Manual valve M is moved by means of a lever 26 connected to a manual control element adapted to be operated by the vehicle driver through suitable linkage (not shown). The manual valve has an addition to port 25, ports 26, 27, 28, 29 and 35. The valve can be moved by control lever 26 into five positions indicated by the dotted lines. These positions are R for reverse, L for manual low, D for automatic drive, N for neutral, and P for park.

With the manual valve M in N or neutral position as shown, oil supply to all controls is interrupted by closing line 24. At the same time port 28 connected to passage 32 leading to the apply side of the low servo S and passage 33 leading to the automatic shift valve are exhausted through ports 28, 26 and 27. Lower land 34 blocks port 35 connected to passage 128 leading from the timing valve group T that controls the low servo S.

When the manual valve M is moved downward from the position N shown, to P or park position by lever 26, the port 25 is blocked as in neutral, ports 28 and 26 are also blocked and port 35 connected to passage 128 is connected to exhaust port 30. Upon movement of the lever 26 to P position a pawl ratchet (not shown) ratchets into engagement with the teeth 37 formed on the output carrier member 38. This positively locks the output shaft 14 of the transmission and prevents the car from moving.

If the manual valve M is moved to D or automatic drive position by lever 26 as controlled by the selector lever, fluid under pressure from port 25, leading from the pressure regulator valve P, is allowed to pass between lands 31 and 39 to port 28 and passage 32 to the low servo S and its timing valve assembly T which will be described in detail below. This fluid acts in chamber 129 on piston 100 to apply the band 9, thus placing the gearing in forward reduction gear. At the same time fluid under pressure from port 25 is allowed to pass between lands 31 and 39 to port 26 and passage 33 leading to the automatic shift control unit A, the construction and operation of which will also be described below. Upon attainment of certain operating conditions of the transmission described below, the automatic shift unit A will allow line pressure to apply the clutch 7 and at the same time act to release the low band 9. This will condition the gearing for the direct drive. Port 35 and passage 128 are at this time blocked by land 34.

Upon movement of the manual valve M to L or manual low position, fluid under pressure from port 25 is allowed to pass between lands 31 and 39 to port 28, passage 32 and the low servo S as was the case in the D position of the manual valve. In this position of the manual valve passage 33 leading to the automatic shift unit A is exhausted between lands 39 and 34 and port 27. Operation of the automatic shift unit A will then have no effect and the transmission cannot shift up. Port 35 is again blocked by land 34.

To place the transmission in reverse the manual valve M is moved by lever 26 to the R position whereby fluid under pressure from passage 24 and port 25 is allowed to pass into the chamber 40 above the manual valve and into port 29 and passage 41. This passage 41 is connected directly to the reverse servo R which acts to apply the reverse band 13, conditioning the transmission for reverse drive as described above and at the same time allowing fluid under pressure to pass to port 42 and sleeve 95 above the pressure regulator valve 19 to urge that valve down and condition the same for high pressure operation, as will be described in more detail below. Passage 32 leading from the low servo S and passage 33 leading from the automatic shift unit A are at the same time connected to exhaust port 27 by the reduced valve portion between lands 31 and 38. Port 35 is again blocked by land 34.

Automatic shift unit

The automatic shift unit A which controls the shift between low forward reduction and forward direct drive of the gearing comprises three valves, a throttle operated valve hereinafter designated, a TV valve 44, a forced downshift valve 52 and a shift valve 46. The TV valve 44 and downshift valve 52 are controlled by lever 47 connected by suitable linkage to the engine accelerator pedal (not shown).

Upon movement of the accelerator pedal between closed throttle and wide open throttle positions the plunger 48 acts through spring 49 to urge the TV valve 44 to the right with a varying force dependent on throttle opening. The valve 44 meters line pressure from line 33 by either connecting line 33 to TV passage 50 or exhaust port 51. The pressure existing in passage 50 acts on the right end of the TV valve 44 to oppose the force of spring 49 to regulate the pressure in line 50 proportional to amount of throttle opening, as is known.

Upon depression of the accelerator pedal beyond wide open throttle position the lever 47 acts to move sleeve valve 52 to the right thereby connecting passage 50 to passage 55 leading to the shift valve 46 causing this to shift down or move to the right. The shift valve 46 comprises a spool valve that acts to connect passage 33 either to exhaust port 58 or clutch apply passage 59 as explained below. The shift valve 46 is urged to the right as seen in the drawing into the downshifted or clutch exhaust position by a spring 60 that bears against the valve body 63. The valve 46 is also urged to the downshifted or right hand position by TV regulator plug 64 that is acted upon by TV pressure leading from line 50 and controlled by TV valve 44. Upon movement of the plug 64 to the right, TV pressure from line 50 is also allowed to pass through passage 65 to act on the large left hand portion of the shift valve 46.

Shift valve 46 is urged to the upshifted or left hand position, as shown in the figure, by governor pressure in passage 67 connected to the extreme right hand end of valve 46 and to the right hand side of the large land on the left end of the valve 46. This governor pressure in line 67 is varied by means of governor G in approximate proportion to speed of the output shaft 14. The operation of this governor G is not described in detail in this application as it is fully described and shown in the application S. N. 322,106 to Maurice S. Rosenberger, referred to above. It is sufficient to say that the pressure in passage 67 varies with the speed of the output shaft 14 and hence the speed of the vehicle. The shift valve 46 is moved between its two extreme positions, i. e., its right hand or clutch-exhaust position and its left hand or clutch-apply position, depending on the TV pressure in line 33, the governor pressure in line 67 and the force of springs 60 and 61.

*Forced downshift*

It should be noted that when the shift valve 46 is in its left hand position and the regulator plug 64 is in its left hand position, TV pressure from passage 50 acts only on the TV plug 64 and cannot act through passage 65 to act on the large end of the shift valve. This means that the transmission will downshift at a lower vehicle speed and governor pressure than is required to upshift the transmission, because of the TV pressure acting on a much smaller area when the shift valve and regulator plug 64 are in their upshifted positions. Upon movement of the accelerator pedal past its wide open throttle position, the lever 47 contacts the sleeve 52 and moves this sleeve against a spring (not shown) that reacts through the linkage and the accelerator pedal to signal the driver that he is moving the sleeve 52. The downshift sleeve 52 is then moved to the right to a position whereby TV pressure from line 50 passes through passage 55 to act on the left hand end of the shift valve 46, and if the governor pressure in passage 67 is not too great, then it will cause the shift valve 46 to move to the right into its clutch-exhaust or downshifted position. When the governor pressure in passage 67 reaches a sufficient value, or upon release of the accelerator pedal from its downshift position allowing sleeve 52 to connect passage 55 to exhaust port 69, shift valve 46 will again move to its left hand or upshifted position. The operation of the shift valve and its control by the governor and accelerator pedal, as well as the accelerator pedal forced downshift, is fully described in S. N. 291,692, referred to above.

A downshift can also be obtained at any time by movement of the manual valve M to the L or manual low position. In this position the manual valve cuts off the supply of fluid to the automatic shift unit, and the clutch apply and band release pressure in conduit 59 is relieved through the shift valve 46, passage 33, port 26 and exhaust port 27 of the manual valve M. This causes a downshift of the transmission with the band applied by the low servo S and the clutch released by spring 157.

*Pressure regulator valve*

The pressure regulator valve P acts to regulate the pressure of the fluid in passages 78 and 24 according to certain operating conditions of the transmission. The details and operation of the pressure regulator valve P are shown and fully described in the copending application of Frank J. Winchell cited above. The valve comprises a spool valve having three lands. The valve is slidably mounted in a valve body 20 that is formed with an outlet port 73 connected to a check valve 23 and an inlet port 18 connected to the output of the front pump 15. The valve is also connected by port 75 to the check valve 23. The check valve chamber 76 is fed by line 21 leading from the rear pump 16, or lines 77 and 18 from the front pump 15.

As fully described in the Winchell application, the valve P acts to regulate pressure in lines 78 and 24 according to the total volume of fluid pumped by the front pump 15 and rear pump 16. At low pumping volume the valve P regulates pressure at a low level, e. g., 50 p. s. i. and at higher pumping volume at a higher pressure, e. g., 90 p. s. i.

At some point of increase in pump output the regulator valve will begin to exhaust the front pump to the intake passage 17 after which the rear pump alone will be supplying the fluid to the passage 78, the excess fluid from the rear pump being exhausted to the converter and also to the intake passage 17.

When the manual valve is placed in reverse or R position, regulated line pressure in line 41 acts on sleeve 95 to urge it downwardly against the regulator valve. This force acts to urge the valve P downwardly. This will cause a still higher pressure, in the neighborhood of 150 p. s. i., to be maintained in line 78 whenever the manual valve m is positioned for reverse.

*Torque converter, lubrication and cooling*

The regulator valve P is the supply of fluid to the torque converter. Excess fluid from the regulation of the line pressure by the regulator valve passes through line 86 into the torque converter. Excess pressure in the torque converter is relieved through passage 87, relief valve 88, passage 89 and then if the oil is at a high temperature to passage 90 leading to a transmission oil cooler (not shown) and from which it returns to passage 91 then to line 92 leading to the transmission clutch and gearing for cooling and lubrication thereof. If the oil is cool it passes directly from passage 89 past a thermostatically controlled valve 93 into the lubrication passage 92.

*Low servo timing valves*

A timing valve assembly, generally indicated T in the drawing, provides for smooth downshifts under varying conditions outlined above.

Whenever the manual valve M is positioned for low or drive operation, fluid under pressure is allowed to pass through port 28 into passage 109. This passage connects to the low servo S so that pressure can act on the left hand end of piston 100 and apply the forward reduction band 9. The rate of flow and hence the rate of application of band 9 is controlled by means of timing valve assembly T. Passage 109 from the manual valve M is continuously connected through orifice 110 to chamber 129 on the apply side of piston 100 in the new servo S and hence fluid under pressure can always pass into or out of chamber 129 at a fixed slow rate. At times a higher rate of flow to the servo is provided. The timing valve assembly T comprises two valves, a first governor sensitive valve 111 hereinafter referred to as the forced downshift timing valve, and a second pressure sensitive valve 112 hereinafter referred to as the closed throttle downshift timing valve. As seen in the figure valve 111 is a spool valve that controls the flow of fluid from passage 109 into a branch passage 114. As shown the valve 111 is urged to its right hand position by a spring 115 that bears against a stop pin 116, the other end of the spring acting on the left hand end of the valve 111. In this right hand position of the valve 111, fluid under pressure from passage 109 is allowed to freely pass through the valve 111 into the passage 114. To the right of valve 111 there is formed a chamber 117 connected by a passage 118 to governor line 67, the pressure in which is controlled by the output shaft governor driven shaft G. When the speed of the vehicle increases the governor G causes an increased pressure in passage 67, 118 and chamber 117 to act on valve 111 to urge it against its spring 115. When the vehicle speed has increased to approximately 24 M. P. H. the governor pressure is sufficient to move the valve 111 to the left where it blocks port 119 thereby forcing fluid from line 32 to pass only through restricted passage 120 to the low servo S.

The forced downshift timing valve 112 is in series with the closed throttle downshift timing valve 111 and therefore also controls the flow of fluid from branch passage 114 to the apply side of the low servo S. Valve 112 is urged to its righthand position by a spring 123 bearing against a stop pin 124. To the right of valve 112 a chamber 125 is connected to the governor pressure passage 118. The spring 123, and the area of valve 112 exposed to fluid in chamber 125, are selected so that when governor pressure is low, say the pressure corresponding to 15 M. P. H., spring 123 is sufficiently strong to hold the valve 112 in its right hand position, whereby flow of fluid from passage 114 to the low servo is blocked. When the governor pressure in chamber 125 increases above the pressure corresponding to 15 M. P. H., governor pressure in chamber 125 will move the valve 112 against the spring 123 to engage stop pin 124, whereby fluid may freely pass from the passage 114 to the low servo.

It will be seen from the above that there are three possible rates of flow into or out of the apply side of the low servo S. Thus, when the vehicle is traveling below approximately 15 M. P. H., the closed throttle downshift valve 112 blocks flow through the timing valve assembly T and fluid can only pass through the restriction 110. With the vehicle traveling above 15 M. P. H., valve 112 opens to connect passage 114 and the low servo whereby fluid can bypass the restriction 110 at a rate depending upon the position of the forced downshift timing valve 111. With the vehicle traveling at a speed between 15 M. P. H. and 24 M. P. H. the valve 111 will be in the position as shown and will allow free flow between passage 32 and 114 and whereby the band 9 will be applied at a relatively fast rate by piston 100. If the vehicle is moving at a relatively faster speed, for example, about 24 M. P. H., the governor pressure will be high enough to move the valve 111 to its left hand position, whereby fluid is permitted to flow only through a restriction 120. The flow to the apply side of the low servo S will then be the sum of the flow through restrictions 110 and 120. This flow is at an intermediate rate from that of the two above-mentioned conditions and hence reduction band 9 will be applied at an intermediate rate.

Branched passage 114, that joins the forced downshift timing valve 111 with the closed throttle downshift valve 112, is connected to the manual valve by conduit 128. When the manual valve M is moved from L or D position to R position, low servo apply fluid in line 109 and the low servo apply chamber 129 is exhausted between lands 34 and 39 to exhaust port 27 of the manual valve. When the manual valve M is moved from L or D position to N or neutral, fluid in line 109 and the low servo apply chamber 129 is exhausted between lands 31 and 39 to exhaust port 27 of the manual valve. When the manual valve M is moved to P or park position, conduit 128 serves to exhaust the fluid through port 35 and exhaust port 30 of the manual valve. Any fluid in the servo apply chamber 129 will pass through valve 111 to conduit 128 because the manual valve will only be moved to park position when the vehicle is stationary and at that time valve 111 will be in its open position whereby conduit 109 and 114 are freely connected.

Closed throttle downshifts

When automatic closed throttle downshifts are made as, for example, when the vehicle is slowing or coasting to a stop the engine speed after the downshift must be R times the engine speed before the downshift. With the throttle closed it takes a longer time for the engine to accelerate to the new higher speed than would be the case where the throttle is open. To allow the engine to speed up under a light load the application of band 9 must be delayed. For this purpose the closed throttle downshift timing valve 112 is provided. This valve 112 ensures that the band servo S will be applied only through the restriction 110 during a closed throttle downshift as such a downshift can only be made with the vehicle traveling below a particular speed, say for example 15 M. P. H. This gives the engine sufficient time to speed up during the interval when the clutch 7 is disengaged and the band 9 not yet fully applied.

Open throttle downshifts

When the planetary gearing of the type shown is in high gear or direct drive with clutch 7 engaged the speed of turbine 3 must be the same as the speed of output shaft 14. When the gearing is in low gear or reduction drive with band 9 applied the turbine speed must be R times the output shaft speed where R equals the gear ratio of the planetary gears when in reduction.

The engine speed and torque converter impeller speeds are considered to be always the same, as usually the engine and impeller are directly connected. It is an inherent characteristic of a fluid torque transmitting device that if the impeller rotates faster than the turbine, the impeller will drive the turbine, that is, in a vehicle transmission the engine will tend to drive the vehicle. If the turbine rotates faster than the impeller the turbine will drive the impeller. This occurs in coasting, for example, when the vehicle will tend to drive the engine.

At vehicle speeds below a certain critical speed, for example about 24 M. P. H. in one application of applicants' invention, the turbine speed is always less than the engine speed regardless of whether the transmission is in its "high gear" condition or "low gear" condition. Thus, if a forced downshift is made at vehicle speeds lower than the certain critical speed, the engine, and hence impeller, will always be rotating faster than the turbine and hence the engine will always tend to drive the vehicle. During this range of operation, when the clutch is disengaged, thereby releasing the load on the turbine and engine, the engine immediately speeds up because the throttle is open and the problem is to get the reaction band on as quickly as possible to prevent engine runaway.

At vehicle speeds above the certain critical speed the low gear turbine speed is greater than the high gear engine speed. If a rapid downshift is made by releasing the clutch and applying the band, the turbine will be driven by the vehicle momentum at R times the output shaft speed whereas the engine initially is rotating at the high gear speed. If the band were applied before the engine could accelerate to a speed above the speed of the turbine in low gear, the turbine would drive the pump and accordingly the vehicle would tend to drive the engine until the engine could speed up to reach a speed above the turbine speed. This change from the engine driving the vehicle to the vehicle driving the engine and then a change back again to where the engine drives the vehicle produces a distinct lurch and objectionable jerk to the occupants of the vehicle. This unpleasant effect is caused by the complete reversal of torque through the entire drive train including the engine, transmission, universal joint and rear axle and is also caused by the sudden change in vehicle motion from a rapid acceleration to a de-acceleration.

To counteract the objectionable reversal of torque during forced downshifts above the critical speed, the application of the band must be delayed until the engine has had time to accelerate to a speed above that of the turbine in its low speed condition. This time is a matter of only a fraction of a second but the time can make the difference between a good shift and a poor shift.

To provide for the desired rate of application of the reaction band during a forced downshift a forced downshift timing valve 111 is provided. This valve is arranged to provide rapid application of the band during forced downshifts at vehicle speeds below the critical speed and to provide for the desired slower band applications during downshifts at vehicle speeds above the critical speed.

Operation

With the manual valve in neutral or park position the engine idling at closed throttle and the vehicle stationary, the pressure regulator valve P will regulate the line pressure at a low level, say for example at 50 p. s. i. Now if the operator places the manual valve in D or automatic drive range, the manual valve permits fluid under pressure to flow through passage 109 and restriction 110 to the apply chamber 129 of the low servo S, whereby piston 100 is moved against springs 104 and 103 to apply the low band 9. With the vehicle stationary, valve 112 is in its right hand position whereby the restriction 110 is the sole means whereby the fluid can pass to apply the low band. This means that when the manual valve is moved from neutral or parked position to D position, the band is applied at a slow rate, and held on at a low pressure.

With the manual valve in D position fluid under pressure passes into conduit 33 that leads to the automatic shift unit A, but with the vehicle stationary, the spring 60 holds the shift valve 46 in its right hand position whereby the direct drive clutch apply passage 59 and low band release passage 153 are connected to exhaust port 58. At the same time the shift valve 46 blocks passage 33 preventing fluid under pressure from entering the clutch apply and band release passage 59. With the manual valve in D or automatic drive position, passage 29 leading to the reverse servo R is open to exhaust at the top of the manual valve. Spring 154 in the reverse servo acts on piston 155 which in turn acts on lever 156 to hold the reverse band 13 in released position. The transmission is now conditioned for low forward drive with low band 9 applied, the direct drive clutch 7 released by spring 157 and the reverse band 13 released. As the driver opens the trottle, the speed of the engine and hence torque converter pump 2 increases driving the torque converter turbine 3 at a reduced rate with increased torque in a well known manner. Gearing input shaft 5 driven by turbine 3 drives through the planetary gearing which further reduces the speed and increases the torque to the output shaft 14. The vehicle then begins to move. As the engine speeds up the front pump 15 also speeds up thereby increasing its output. When the output reaches a certain value the pressure regulator valve P begins to regulate the pressure at a higher pressure, increasing from the 50 p. s. i. low level up to the 90 p. s. i. maximum level. This increase in pressure results in an increase in the low band 9 torque capacity. As mentioned above in the description of the pressure regulator valve P, the pressure increases from the 50 p. s. i. level to the 90 p. s. i. level as the square of the output from the pumps. Because the torque transmitted by the torque converter likewise increases as the speed of the engine shaft, the pressure will rise proportionately with the torque from the torque converter, and hence apply the band with a force that varies with its torque load.

As the vehicle speed increases the governor G causes an increase in governor pressure in line 67. This pressure when high enough acts on the shift valve 46 to overcome the force of the shift valve spring 60 as well as the force of the TV pressure in line 50 as controlled by the throttle regulator valve 44. At this time the shift valve 46 will move to the left allowing regulated line pressure in line 33 to pass into the clutch apply passage 59 where it acts on the clutch apply piston 158 and at the same time acts through passage 153 on the release side of the low servo piston 100 to aid the springs 103 and 104 in overcoming the servo apply pressure in chamber 129 to move the piston 100 and rod 102 to release the band 9. The low servo acts as an accumulator for the buildup of pressure on the clutch apply piston 158 and the clutch 7 is fully applied about the same time the low band 9 has been released sufficiently to allow the drum 108 to slip. The vehicle is now in direct drive with clutch 7 locking the planetary gearing up as a unit.

With the transmission in direct drive there are various conditions under which a downshift to low drive can be effected. For example, if the speed of the vehicle decreases sufficiently so that the pressure in line 67 as produced by the governor G is insufficient to hold shift valve 46 against movement to the right by spring 60 and the force of TV pressure in line 50 acting on the plug 64, the shift valve 46 will return to its right hand position as shown in the figure. Now the clutch apply passage 59 connected to exhaust port 58 allows the pressure in line 59 and the low band release passage 153 to drop. Main line pressure in line 109 now is sufficient to move the piston 100 against springs 103 and 104 to its right hand or band apply position to fill the increased volume in chamber 129. As the piston moves to the right fluid must flow from line 109 into the chamber 129. This flow is controlled by the timing valve assembly T. If the downshift is occurring with the throttle in closed position, as in the case of a coast-down downshift, the speed at which a downshift occurs will be at a fairly low point, say below 15 M. P. H., and under these conditions the governor pressure in chamber 125 is insufficient to move the closed throttle downshift timing valve 112 against spring 123 and the valve 112 be held in its right hand position whereby flow to the chamber 129 is only through the restriction 110. This means that the band will be applied at a relatively slow rate under these conditions.

With the vehicle moving below a certain maximum speed of, say for example, approximately 50 M. P. H., the driver can, by depressing foot accelerator past the wide open throttle position, move the downshift sleeve 52 to a position whereby throttle pressure in line 50 will pass through to conduit 55 and act on the left hand end of the shift valve 46 and with the help of spring 60 can move the shift valve to the right against the force of governor pressure in line 67 acting on the right hand end of the shift valve. If the governor pressure is sufficiently high, for example above 50 M. P. H., TV pressure cannot move the shift valve 46 to its downshift position. with the shift valve 46 being downshifted or moved to the right by the action of the driver in depressing the accelerator pedal past wide open throttle position, clutch apply passage 59 and band release passage 153 will be exhausted through port 58 as was the case in the closed throttle or coast-down downshift described above. The pressure in line 109 will also act in chamber 129 on piston 100 to apply the low band 9. However, under these conditions the vehicle speed will be above 15 M. P. H. and the governor pressure will be great enough to move valve 112 to connect passage 114 to band apply passage 32. Now if the speed of the vehicle is above the critical speed referred to above, for example 25 M. P. H., the governor pressure in line 118 will be sufficiently high to also move the valve 111 to a position whereby fluid can pass from line 109 to passage 114 only through the restriction 120. This means that fluid can flow from passage 109 into the chamber 129 through both restriction 110 and restriction 120 and whereby the band 9 will be applied at a faster rate than was the case during a closed throttle or coast-down downshift.

The flow to the low servo is still sufficiently restricted to give the engine sufficient time to raise the speed of the impeller 2 to a point above the speed the turbine will have after the band is applied and the gearing in reduction drive. This will prevent reversal at torque during the downshift as explained above.

If, upon making a forced downshift as described above, the vehicle speed is below the critical speed, say approximately 25 M. P. H., the forced downshift timing valve 111 will be in its right hand position as shown as under this condition the governor pressure in line 118 cannot overcome the force of the spring 115. With the valve 111 in its right hand position there is unrestricted flow from line 109 to passage 114 through the timing valve 112 or 147 to the band apply chamber 129. This means that the band will be applied at a still faster rate than was the case in the closed throttle downshift or the forced downshift above 25 M. P. H.

The fast rate of flow to the servo is possible under low speed open throttle downshifts because under these conditions the impeller 2 will always be rotating faster than the turbine, even though the turbine is being driven at R times the output shaft 14 speed.

A downshift can also be initiated by moving the manual valve M from D to L position. The timing valves then act to regulate the rate of flow, and hence rate of band application, in the same manner as an accelerator pedal full throttle forced downshift. Thus, if the vehicle speed is above 25 M. P. H., the forced downshift timing valve 111 will be in its left hand or restricted flow position and the closed throttle downshift timing valve 112 in its left hand or full open position. The rate of band application will then be controlled by the restrictions 110 and 120 which will produce an intermediate rate of band application.

If a manual valve downshift is made below 25 M. P. H., but above about 15 M. P. H., both the timing valve 111 and the timing valve 112 will be in their open position. The rate of band application will then be unrestricted and the band applied rapidly.

It can be seen from the above that the two timing valves act to cause different rates of application of the reduction band under different speed conditions of the transmission. These different rates of band application are desirable for effecting smooth and efficient downshifts during different torque and speed conditions. Thus, for example, with the engine idling or being driven through the transmission by the vehicle wheels the torque transmitted by the transmission is at a fairly low level, and to effect a smooth application of the band 9 a slow application of the band is desirable. It will be seen from the above description of operation that the timing valves act to produce such a result. When the downshifts occur with the engine driving the vehicle as would be the case during a forced downshift it is desirable that the band be applied at a faster rate, for example, to prevent engine runaway, and again it can be seen from the above description of the operation, the timing valves perform this desired result. When the vehicle is traveling at a relatively high speed, as for example 25 M. P. H., the engine must have time to accelerate to a faster speed to prevent reversal of torque during the downshift, and here again the timing valves in applicants' control system act to give the desired operation.

Other advantages and features for the transmission and control system described above are believed to be obvious to one skilled in the art.

While this specification describes in detail only the preferred embodiments of the invention, it is intended that equivalent structures embodying the principles and features as would occur to those persons skilled in the art are within the scope of the invention for which protection is sought and such scope must be limited only by the appended claims.

We claim:

1. In a transmission having a fluid actuated member adapted to change the gear ratio between rotatable driving and driven elements of the transmission, a source of fluid under pressure, selector valve means at times adapted to direct fluid from said source to said fluid actuated means, flow control means for controlling the rate of flow of fluid from said selector valve means to said fluid actuated means, said flow control means including a plurality of passages controlled by a plurality of independent timing valves, certain of said passages including restrictions, means responsive to the speed of one of said rotatable elements for operating said timing valves, one of said valves being operable to restrict flow at a relatively low speed of said one rotatable element and the other valve being operable to restrict flow at a relatively high speed of said one rotatable element.

2. In a transmission having an input shaft, an output shaft, and a fluid actuated member adapted to change the gear ratio of the transmission, a source of fluid under pressure, selector valve means at times adapted to direct fluid from said source to said fluid actuated means, flow control means for controlling the rate of flow of fluid from said selector valve means to said fluid actuated means, said flow control means including a plurality of passages controlled by a plurality of independent timing valves, certain of said passages including restrictions, means for operating said timing valves at different speeds of one of said shafts, said last mentioned means including a hydraulic governor adapted to produce a fluid pressure responsive to the speed of one of the shafts, and fluid passages between said governor and said timing valves.

References Cited in the file of this patent

UNITED STATES PATENTS

| | | |
|---|---|---|
| 2,693,260 | Lucia | Nov. 2, 1954 |
| 2,740,304 | Sheppard | Apr. 3, 1956 |

FOREIGN PATENTS

| | | |
|---|---|---|
| 702,054 | Great Britain | Jan. 6, 1954 |